(12) United States Patent
Vanderzon

(10) Patent No.: US 10,021,749 B2
(45) Date of Patent: Jul. 10, 2018

(54) PHASE CONTROL DIMMER CIRCUIT WITH SHORT-CIRCUIT PROTECTION

(71) Applicant: GERARD LIGHTING HOLDINGS PTY LTD, South Australia (AU)

(72) Inventor: James Vanderzon, MacDonald Park (AU)

(73) Assignee: Ozuno Holdings Limited, Tortola (VG)

( * ) Notice: Subject to any disclaimer, the term of this patent is extended or adjusted under 35 U.S.C. 154(b) by 0 days.

(21) Appl. No.: 15/313,073

(22) PCT Filed: May 20, 2015

(86) PCT No.: PCT/AU2015/000300
§ 371 (c)(1),
(2) Date: Nov. 21, 2016

(87) PCT Pub. No.: WO2015/176113
PCT Pub. Date: Nov. 26, 2015

(65) Prior Publication Data
US 2017/0142795 A1    May 18, 2017

(30) Foreign Application Priority Data

May 22, 2014    (AU) ................................ 2014901925

(51) Int. Cl.
*H05B 33/08* (2006.01)
*H02H 3/093* (2006.01)
(Continued)

(52) U.S. Cl.
CPC ......... *H05B 33/0845* (2013.01); *H02H 3/021* (2013.01); *H02H 3/093* (2013.01);
(Continued)

(58) Field of Classification Search
CPC ....... G01R 19/175; G01R 19/14; H02M 1/32; H02M 1/44; H02M 3/33546;
(Continued)

(56) References Cited

U.S. PATENT DOCUMENTS

| 7,339,331 | B2 | 3/2008 | Vanderzon | |
| 2003/0197995 | A1* | 10/2003 | Hua | H02M 5/293 361/100 |

(Continued)

FOREIGN PATENT DOCUMENTS

WO    WO 2015/176113    11/2015

OTHER PUBLICATIONS

Op-Amp Basics Peggy Alavi National Semiconductor—Sep. 2003.*

(Continued)

*Primary Examiner* — Alexander H Taningco
*Assistant Examiner* — Renan Luque
(74) *Attorney, Agent, or Firm* — The Webb Law Firm

(57) ABSTRACT

A trailing edge phase control dimmer circuit for controlling alternating current (AC) power to a load with short-circuit protection, wherein a switching control circuit includes a zero-crossing detection circuit configured to detect zero crossings of the AC and to detect crossings of a first threshold value and a second threshold value of the rectified dimmer voltage, and wherein the zero-crossing detection circuit is further configured to initiate the switching circuit to commence one of the conduction periods when the rectified dimmer voltage crosses below the first threshold value and to initiate the switching circuit to prematurely terminate one of the conduction periods when the rectified dimmer voltage crosses above the second threshold value to provide short-circuit protection for the trailing edge phase control dimmer circuit.

19 Claims, 4 Drawing Sheets

(51) Int. Cl.
    *H02M 1/08*     (2006.01)
    *H05B 37/02*     (2006.01)
    *H02H 3/02*     (2006.01)
    *H02M 1/00*     (2006.01)

(52) U.S. Cl.
    CPC .............. *H02M 1/08* (2013.01); *H05B 37/02* (2013.01); *H02M 2001/0058* (2013.01)

(58) Field of Classification Search
    CPC .... H02M 2001/0006; H02M 2001/322; H03K 5/1536
    USPC .................................... 361/100, 77, 85, 93.9
    See application file for complete search history.

(56) References Cited

U.S. PATENT DOCUMENTS

| | | | | |
|---|---|---|---|---|
| 2006/0158808 A1* | 7/2006 | Scheikl | ............... | H01L 27/0251 361/90 |
| 2009/0184662 A1* | 7/2009 | Given | ................ | H05B 33/0815 315/294 |
| 2010/0254055 A1 | 10/2010 | Vanderzon | | |
| 2011/0121752 A1* | 5/2011 | Newman, Jr. | .......... | H05B 39/04 315/291 |
| 2012/0112564 A1* | 5/2012 | Wu | ........................ | H02M 1/44 307/326 |
| 2013/0002163 A1 | 1/2013 | He et al. | | |
| 2016/0087619 A1* | 3/2016 | Lee | ...................... | H03K 5/1536 327/79 |

OTHER PUBLICATIONS

International Search Report and Written Opinion of International Patent Application No. PCT/AU2015/000300, filed May 20, 2015, dated Jun. 5, 2015. 14 pages.

\* cited by examiner

PHASE CONTROL DIMMER CIRCUIT WITH SHORT-CIRCUIT PROTECTION

This application is a U.S. National Stage of International Application No. PCT/AU2015/000300, filed May 20, 2015, which claims benefit of Australia Application No. 2014901925, filed on May 22, 2014, which are incorporated by reference herein.

TECHNICAL FIELD

The present invention relates to phase control dimmer circuit for controlling alternating current (AC) power to a load, with short-circuit protection.

In particular, but not exclusively, the present invention relates to a trailing edge phase control dimmer circuit having a MOSFET switching circuit for controlling a capacitive load, such as a driver for LED lights, with short-circuit protection.

BACKGROUND OF INVENTION

Dimmer circuits are commonly used to control power, in particular alternating current (AC) mains power, to a load, such as a light source. In one existing method, a light source can be dimmed using phase controlled dimming whereby power provided to the load is controlled by varying the amount of time that a switch connecting the load to a mains power source is conducting during a cycle of the AC (i.e. varying the duty time). Specifically, AC power to the load is switched ON and OFF during each half cycle of alternating current and the amount of dimming of the load is provided by the amount of ON time in relation to the OFF time for each half cycle.

Phase control dimmer circuits generally operate as trailing edge or leading edge dimmer circuits, and the two circuits are suited to different applications. In leading edge circuits, power is switched OFF at the beginning of each half cycle. In trailing edge circuits, power is switched OFF later in each half cycle (e.g. towards the end of each half cycle). Leading edge dimmer circuits are generally better suited to controlling power to inductive loads, such as small fan motors and iron core low voltage lighting transformers. Trailing edge dimmer circuits, on the other hand, are generally better suited to controlling power to capacitive loads, such as drivers for Light Emitting Diode (LED) lights.

Phase control dimmer circuits generally switch ON and OFF AC power with a high voltage to the load. Generally, the dimmer circuit and the load are connected in series to the AC power. Thus, if a defect in the load circuitry or in the load itself occurs, the dimmer circuit will see a short-circuit as the load which can cause a sudden surge of high current which is damaging to the load and/or the dimmer circuit. Accordingly, exemplary prior art phase control dimmer circuits employ various techniques to provide short-circuit protection to guard against load faults, such as incorrect wiring of the load circuitry.

More specifically, in existing examples of MOSFET switched dimmer circuits, a short-circuit event or an over current condition can be determined by: monitoring voltage drop across series current sense resistor element, monitoring voltage drop across an intrinsic diode (in AC half-cycle polarity when intrinsic diode is forward-biased) of the MOSFET, or monitoring voltage drop across the MOSFET channel resistance (in AC half-cycle polarity when intrinsic diode is reverse-biased). In the example where the voltage drop across the MOSFET channel resistance is monitored, an additional comparator circuit required. It will be appreciated by those persons skilled in the art that the MOSFET channel resistance is a component of the the ON-state resistance of a MOSFET switched dimmer circuit. For example, the ON-state resistance of the MOSFET is 1Ω at the highest operating temperature.

In this example, the dimmer circuit is a trailing edge phase control dimmer circuit having a MOSFET switching circuit for controlling delivery of AC power to a load and a switching control circuit for controlling switching of the MOSFETs. The MOSFETs are configured so that they alternately control power delivery to the load over the different polarity half cycles of AC power. That is, the MOSFETs turn-ON and turn-OFF the switching circuit at each cycle of the AC, respectively, so that the load (e.g. a driver for LED down lights) is dimmed in proportion to the amount of time in each cycle that the switching circuit is switched OFF. The MOSFETs of the exemplary switching circuit have an ON-state (conducting state) resistance made up of several components of resistance including: MOSFET source diffusion resistance, channel resistance, accumulation resistance, "JFET" component resistance, drift region resistance, and substrate resistance. In the example, the additional comparator circuit is employed to compare the MOSFET ON-state voltage drop with a reference voltage to determine whether a short-circuit condition has occurred in the exemplary dimmer circuit and/or the load. If the MOSFET ON-state voltage drop is greater than the reference voltage then the comparator circuit activates a cut-out circuit to remove gate drive from the MOSFET.

It will be appreciated by those persons skilled in the art that the MOSFET ON-state voltage drop is indicative of the load current. An increase in magnitude of the load current is indicative of a short-circuit condition occurring and the gate voltage of the MOSFETs is subsequently modified to turn-OFF the MOSFETs. The comparator circuit, however, must have components selected to withstand the high voltage across the MOSFETs when it is switched OFF in the non-conducting state, which adds additional complexity and cost to the exemplary dimmer circuit.

SUMMARY OF INVENTION

Accordingly, in one aspect, the present invention provides a trailing edge phase control dimmer circuit for controlling alternating current (AC) power to a load with short-circuit protection, the circuit including: a switching circuit for controlling delivery of AC power to the load by conducting power to the load in an ON state and not conducting power to the load in an OFF state, wherein the ON state is a conduction period and the OFF state is a non-conduction period; a switching control circuit for controlling turn-OFF and turn-ON of the switching circuit at each half cycle of the AC to control switching of the ON and OFF states of the switching circuit; and a rectifier for rectifying the AC power in the non-conduction period to generate rectified dimmer voltage to be provided to the dimmer circuit, wherein the switching control circuit includes a zero-crossing detection circuit configured to detect zero crossings of the AC and to detect crossings of a first threshold value and a second threshold value of the rectified dimmer voltage, wherein the zero-crossing detection circuit is further configured to initiate the switching circuit to commence one of the conduction periods when the rectified dimmer voltage crosses below the first threshold value and to initiate the switching circuit to prematurely terminate one of the conduction periods when the rectified dimmer voltage crosses above the second threshold value to provide short-circuit protection for the trailing edge phase control dimmer circuit.

In an embodiment, the switching circuit includes two MOSFETs to control turn-OFF and turn-ON at each half cycle of the AC respectively to the OFF and ON states. The switching control circuit thus provides gate control of the MOSFETs to control the turn-OFF and turn-ON of the MOSFETs. In other embodiments, the switching circuit includes other switching devices such as other Field-effect transistors to control turn-OFF and turn-ON at each half cycle of the AC. Alternatively, the switching circuit includes IGBT switching devices instead of FETs.

In the embodiment, the MOSFETs have gate driven latches which latch the MOSFETs to the ON state at each half cycle of the AC upon the zero-crossing detection circuit detecting the rectified dimmer voltage crossing below the first threshold value. Also, the MOSFETs gate driven latches unlatch the MOSFETs to the OFF state at each half cycle of the AC at an end of the conduction period, and the MOSFETs gate driven latches unlatch the MOSFETs to the OFF state upon the zero-crossing detection circuit detecting the rectified dimmer voltage crossing above the second threshold value. That is, the dimmer circuit is configured to effectively latch into the conducting period at each half-cycle zero-crossing, and subsequently is unlatched at the end of the pre-determined half-cycle conduction period, or is prematurely unlatched prior to the pre-determined half-cycle conduction period if a short-circuit condition is detected.

Also, the embodiment exploits the MOSFET ON-state resistance as a current-sense element in implementing short-circuit turn-OFF. The MOSFETs are arranged to be part of the latch function, which latch to the ON-state at the zero-crossing lower threshold event. It is the MOSFET change from OFF-state to the ON-state which maintains the zero-crossing detector output in the active state, which is conductive for maintaining the MOSFETs in the ON-state, to achieve the latched ON-state condition. Under short-circuit load conditions in the half-cycle conduction period, the MOSFET ON-state voltage rises in direct proportion to the product of the ON-state resistance and the short-circuit current magnitude.

Preferably, second threshold value of the rectified dimmer voltage is selected based on the worst case condition of MOSFET ON-state resistance (i.e. when hot) and the desired current threshold. For example, for a MOSFET with a maximum ON-state resistance of 1Ω and a target current cut-out threshold of 15 A, the selected second threshold value for the zero-crossing detection circuit is 15V. It would be appreciated that lower performance MOSFETs (e.g. those having higher ON-state resistance) would need to be run using a lower second (e.g. cut-out) threshold value to avoid excessive temperature rise under sustained short-circuit load conditions. Additionally, the second cut-out threshold value needs to have sufficient margin above the peak currents experienced under normal operating conditions of the dimmer circuit. For example, for a 2 A rated dimmer, this could be about 3 A for resistive loads, but may exceed 10 A when factoring in issues such as load inrush current for, say, capacitive loads.

Also, the switching control circuit controls a turn-OFF transition of the MOSFETs between the ON state and the OFF state extending for a selected turn-OFF transition time and a turn-ON transition of the MOSFETs between the ON state and the OFF state extending for a selected turn-OFF transition time. The turn-OFF transition time is proportional to a discharge time of MOSFETs gate capacitance of the MOSFETs. It will be appreciated by those persons skilled in the art that MOSFET switching controls drain current using gate voltage. MOSFETs, however, have input and output capacitances which affect the switching time of the MOSFETs. Thus, for instance, when switching to an OFF state, the MOSFET is transitioned through a turn-OFF transition whilst the MOSFET capacitance (in particular, MOSFET gate capacitance) is discharged which occurs over a turn-OFF transition time. During a short-circuit condition, it is preferable that the MOSFET short-circuit turn-OFF transition time should occur as fast as possible to avoid excessive energy dissipation by the MOSFETs due to the abnormally high current that occurs in short-circuit conditions.

In an embodiment, the switching control circuit further includes a fast-OFF circuit for controlling a short-circuit turn-OFF transition of the MOSFETs unlatching to the OFF state extending for a selected short-circuit turn-OFF transition time upon the zero-crossing detection circuit detecting the rectified dimmer voltage crossing above the second threshold value. The fast-OFF circuit is in addition to a normal operating condition turn-OFF circuit of the switching control circuit for controlling a turn-OFF transition of the conduction period. It will be appreciated by those persons skilled in the art that the turn-OFF transition influences the production of conducted harmonics causing electromagnetic interference (EMI) emissions when switching ON and OFF power to the load. Accordingly, existing exemplary trailing edge phase control dimmer circuits have been configured to produce a more gradual transition between conducting and non-conducting states of the switching circuit to minimise these EMI emissions. For example, in an existing trailing edge dimmer circuit, the turn-OFF transition time of the switch for each half cycle is increased so that power is switched OFF more gradually to the load to reduce the magnitude of associated radio frequency (RF) harmonics produced causing EMI emissions, and thus to minimise line conducted EMI emissions. In trailing edge dimmer circuits, switching OFF of the switching circuit provides greater EMI emissions than switching ON, as switching ON is performed at the zero crossing of the AC.

Nonetheless, in an embodiment, the fast-OFF circuit for controlling the short-circuit turn-OFF transition includes a transistor Q13 configured to be pulled low to cause discharge of the MOSFETs gate capacitance via resistor R20 with a selected resistance to select the discharge time of the MOSFETs gate capacitance. For example, the resistor R20 is a 1 KΩ resistor which provides for a fast discharge time of the MOSFETs gate capacitance.

Preferably, it is desirable to have a short-circuit induced turn-OFF that is faster than, say, the turn-OFF transition time during normal half-cycle operation. In particular, the short-circuit turn-OFF transition time should be significantly faster than the normal turn-OFF transition to, for instance, limit associated energy absorption of the dimmer circuit. As described, the switching control circuit includes a circuit for controlling turn-OFF of the MOSFETs at each cycle of the AC to control switching of the ON and OFF states of the MOSFETs. The switching control circuit provides gate drive control of the MOSFETs to control a turn-OFF transition of the MOSFETs between the ON state and the OFF state which extends for a selected turn-OFF transition time. In an embodiment, the switching control circuit includes a transistor Q12 configured to be pulled low to cause discharge of the MOSFETs gate capacitance via a resistor R16 with a selected resistance to select the discharge time of the MOSFETs gate capacitance in the normal turn-OFF transition.

For example, R16 is a 56 KΩ resistor which provides for a slower discharge time of the MOSFETs gate capacitance than the 1 KΩ resistor R20 of the fast-OFF circuit.

In an embodiment, the zero-crossing detection circuit includes a differential transistor pair Q1 & Q2 to implement comparator functions of determining whether the rectified dimmer voltage crosses below the first threshold value and above the second threshold value. The zero-crossing detection circuit then outputs determinations of the comparator functions to a conduction period timing circuit of the switching control circuit, configured to determine the conduction periods, and wherein the conduction period timing circuit is configured to alter the conduction periods based on the outputs of the zero-crossing detection circuit.

In a further embodiment, the zero-crossing detection circuit incorporates comparator reference threshold hysteresis to establish the second (cut-out) threshold value, when turn-OFF of the MOSFETs occurs.

In another embodiment, the conduction period timing circuit further includes timer output transistors Q7 & Q8, which are not in conduction during the conduction periods, to enable a self-biased transistor Q9 of the conduction period timing circuit to supply base drive current to a gating transistor Q14 of the fast-OFF circuit.

BRIEF DESCRIPTION OF DRAWINGS

Embodiments of the invention will now be described, by way of example only, with reference to the accompanying drawings, in which.

DETAILED DESCRIPTION

Figure 1:
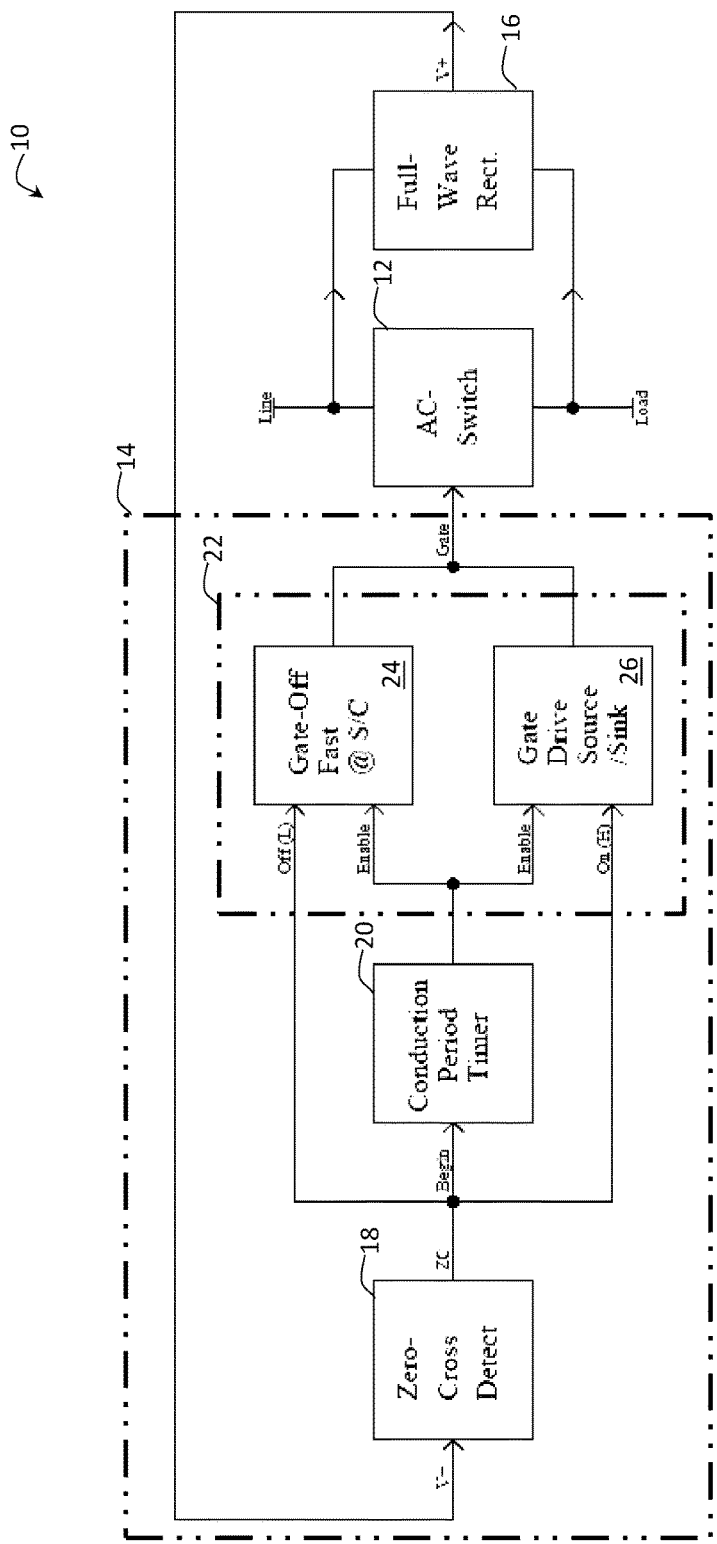
FIG. 1 is a block diagram showing some circuits of a trailing edge phase control dimmer circuit dimmer circuit according to an embodiment of the present invention.

FIG. 1 shows some of the circuits of a 2-wire trailing edge phase control dimmer circuit 10 in a block diagram form, according to an embodiment of the present invention, that are configured to control power to a load, with short-circuit protection. It will be appreciated by those persons skilled in the art that many of the circuits of the dimmer circuit 10 do not affect the provision of short-circuit protection and thus will not be discussed in detail herein.

The dimmer circuit 10 shown in the embodiment of FIG. 1 includes an AC switching circuit 12 for controlling delivery of AC power to the load by conducting power to the load in an ON state and not conducting power to the load in an OFF state, as described. It will be appreciated by those persons skilled in the art that the ON-state is a conduction period and the OFF-state is a non-conduction period, which are configured in duration to control dimming of, for example, a LED light where the load is an LED light driver. The AC switching circuit 12 is connected to a switching control circuit 14 having a number of circuits for controlling turn-OFF and turn-ON of the AC switching circuit 12 at each half cycle of the AC to control switching of the ON and OFF states of the switching circuit 12. The switching control circuit 14 also controls the function of short-circuit protection for the dimmer circuit 10, as described above. Further, the dimmer circuit 10 includes a rectifier 16 for rectifying the AC power in the non-conduction period to generate rectified dimmer voltage to be provided to the dimmer circuit 10.

The switching control circuit 14 has a zero-crossing detection circuit 18 configured to detect zero crossings of the AC and to detect crossings of a first threshold value and a second threshold value of the rectified dimmer voltage. The zero-crossing detection circuit 18 is connected to a conduction period timing circuit 20 configured to determine the conduction periods and to alter the conduction periods based on the outputs of the zero-crossing detection circuit 18. Further, the conduction period timing circuit 20 is connected to a gate drive circuit 22 to turn-ON and turn-OFF the AC switching circuit 12 to provide the conduction and the non-conduction periods. In the embodiment, the gate drive circuit 24 includes a fast-OFF circuit 26 to control a short-circuit turn-OFF transition of the AC switching circuit 12 when a short-circuit condition is detected and a normal operating gate drive circuit 26 to control the turn-ON and turn-OFF the AC switching circuit 12 during normal operating conditions.

As described, the zero-crossing detection circuit 16 is configured to detect zero crossings of the AC and to detect crossings of a first threshold value and a second threshold value of the rectified dimmer voltage. The zero-crossing of the AC occurs when the AC line voltage equals zero between the two polarities of the half cycles. As described, in practice, the crossing between conduction and non-conduction periods does not generally occur exactly at the AC line voltage zero-crossing. For example, in the embodiment, the first threshold value is selected as a low threshold voltage of 5V and the second threshold value is a high threshold value of 10V. The first threshold value selection is based on two considerations: firstly, since this is used for line voltage zero-crossing commencement of half-cycle conduction period, it is selected in conjunction with the sum of gate drive circuit propagation delay and MOSFET turn-ON delay (the latter being dominant); secondly, the first threshold value must have sufficient margin above the MOSFET ON-state voltage drop under normal operating conditions (e.g. with maximum load condition). Thus, for example, for a total delay of 50 us, 5V is selected as the first threshold. As discussed the second, high threshold value of 10V is selected based on the worst case condition of the MOSFET ON-state resistance (1Ω) and the desired current threshold (10 A).

Also, the zero-crossing detection circuit 16 is configured to initiate the AC switching circuit 12 to commence a conduction period when the rectified dimmer voltage crosses below the first threshold value and to initiate the AC switching circuit 12 to prematurely terminate a conduction period when the rectified dimmer voltage crosses above the second threshold value to provide short-circuit protection for the trailing edge phase control dimmer circuit. That is, the zero-crossing detection circuit 16 initiates control of the gate drive circuit 22 to turn-OFF the AC switching circuit 12 to provide the conduction and the non-conduction periods and to provide short-circuit protection in the event of a short-circuit condition being detected.

Figure 2:
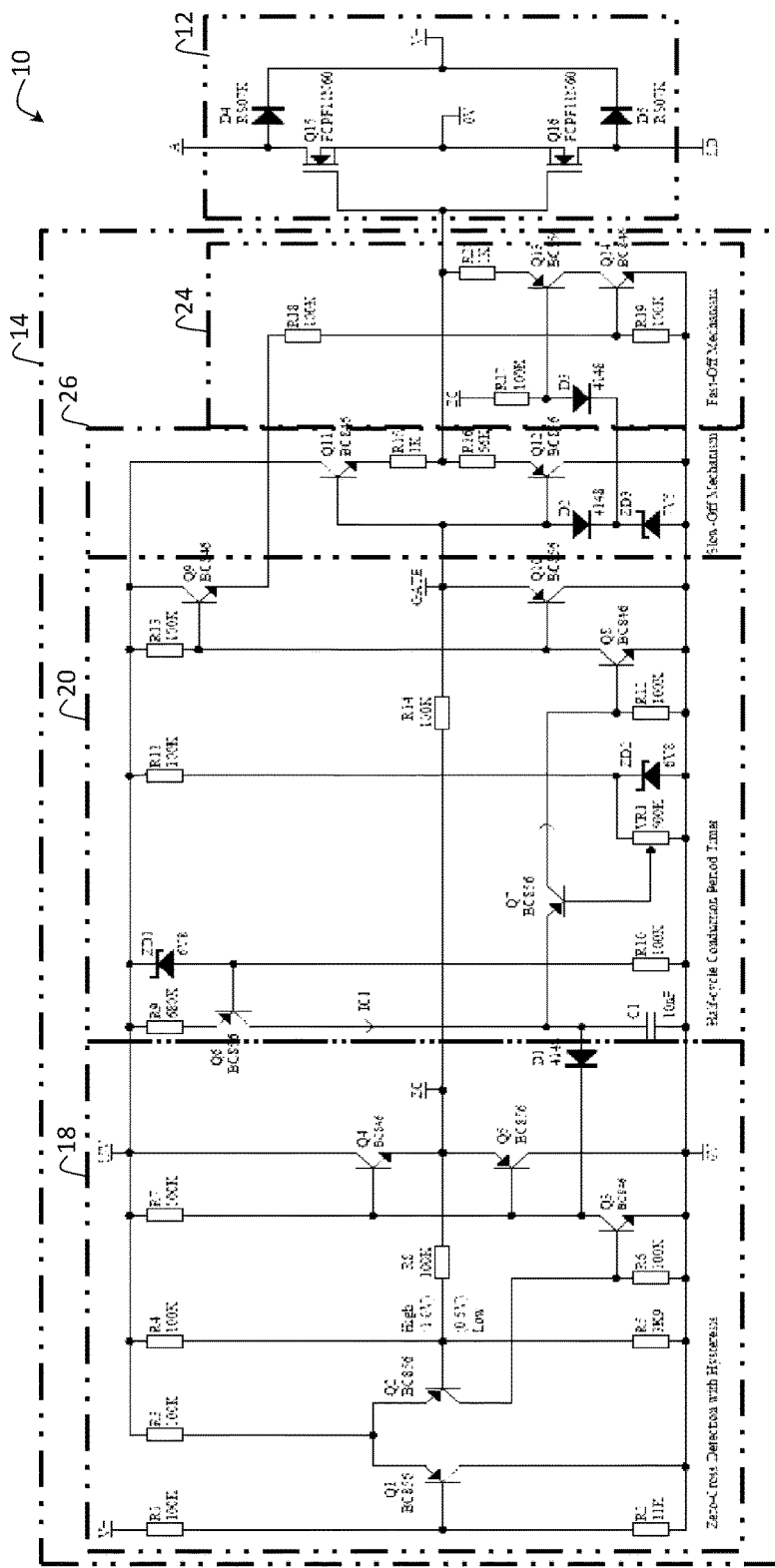
FIG. 2 shows a trailing edge phase control dimmer circuit according to an embodiment of the present invention.

An embodiment of a functional implementation of the dimmer circuit 10 shown generally as the block diagram of FIG. 1 is shown in more detail in FIG. 2. In this embodiment, the dimmer circuit 10 is also a trailing edge phase control dimmer circuit with the AC switching circuit 12 and the switching control circuit 14. The AC switching circuit 12 in the embodiment is a MOSFET switching circuit, as described above, and includes MOSFET switching elements Q15 and Q16 (e.g. high voltage (600V) N-channel MOSFETs such as a FCPF11N60), which are used to control the amount of AC power delivered to the load. As described, the MOSFETs Q15 and Q16 are configured so that they alternately control power delivery to the load over the different polarity half cycles of AC power. That is, the MOSFETs Q15 and Q16 turn-ON and turn-OFF the AC switching circuit 12 at each cycle of the AC, respectively, so that the load (e.g. a driver for LED down lights) is dimmed in proportion to the amount of time in each cycle that the switching circuit 12 is switched OFF and not conducting power to the load. In the embodiment, the load is, for instance, a capacitive load in the form of a driver for LED lights.

The switching control circuit 14 of the embodiment shown in FIG. 2 implements MOSFET gate drive control using the gate drive circuit 26 in normal operating conditions and the fast-OFF circuit 24 to control a short-circuit turn-OFF transition under short-circuit conditions, with input from the zero-crossing detection circuit 18 and the conduction period timing circuit 20. Specifically, under normal operating conditions, the gate drive circuit 26 uses transistors Q11 and Q12 to implement MOSFET gate drive control. Here, the transistors Q1 and Q2 are BC856 PNP transistors. Transistor Q11 base drive with input from the zero-crossing circuit 16 is pulled high to charge MOSFET gate capacitance of the MOSFETs Q15 and Q16 via resistor R15 to hold the MOSFETs Q15 and Q16 in the ON state condition. In the embodiment, R15 is a 1 KΩ resistor. Diode D2 and Zener diode ZD3 are also employed to clamp the MOSFETs Q15 and Q16 ON state gate voltage at a suitable level for proper bias. D2 is again a 4148 high speed diode and ZD3 is a 7V5 Zener diode. Transistor Q12 base drive is also pulled low to cause discharge of MOSFET gate capacitance via resistor R16, which is of a value that is selected to provide the desired turn-OFF transition time of the MOSFETs Q15 and Q16 of the AC switching circuit 12. Here, R16 is selected as a 56 KΩ resistor.

Under short-circuit operating conditions, the switching control circuit 14 uses the fast-OFF switching circuit 24 for controlling a short-circuit turn-OFF transition rather than the normal gate drive circuit 26. The conduction period timing circuit 20 includes a self-biased transistor Q9 which supplies base drive to a gating transistor Q14 of the fast-OFF circuit 24 during the conduction periods to enable operation of the fast-OFF circuit 24. The fast-OFF circuit 24 includes a transistor Q13 configured to be pulled low when a short-circuit is detected to cause discharge of the MOSFETs gate capacitance via resistor R20. In the embodiment, resistor R20 is selected as a 1 KΩ resistor to provide a faster turn-OFF transition time relative to the normal turn-OFF time which is determined by a 56 KΩ resistor.

As described, the zero-cross detection circuit 18 is configured to detect short-circuit conditions by being configured to detect crossing of the first (e.g. 5V) and the second (e.g. 10V) threshold value of rectified dimmer voltage. Specifically, in the embodiment, the zero-crossing detection circuit 18 detects the rectified dimmer voltage rising above the second threshold value of 10V, which is indicative of short-circuit conditions. During normal operating conditions, the zero-crossing detection circuit 18 detects when the rectified dimmer voltage crosses below the first threshold value of 5V.

The zero-crossing detection circuit 18 includes an input stage having a differential transistor pair Q1 & Q2 to implement such a comparator function, and the output of which appears at the transistor Q3 collector, which is buffered by transistors Q4 & Q5. Voltage divider resistors R1 & R2 scale down the rectified dimmer voltage so as to be suitable for inverting input at the transistor Q1 base of the zero-crossing detection circuit 18. The first threshold value voltage (e.g. 5V) is a reference voltage that is used for half-cycle zero-crossing conduction period commencement (at V+≤5V) and is largely determined by resistors R4 & R5. In the embodiment, the resistors R4 and R5 are 100 KΩ and 3.9 KΩ resistors respectively. Also, R1 is a 100 KΩ resistor and R2 is an 11 KΩ resistor. Thus, the zero-crossing detector circuit 18 initiates a half-cycle conduction period commencement when the detected rectified dimmer voltage falls below the lower threshold of 5V.

The output of the comparator function of the zero-crossing detection circuit 18 also includes positive feedback to the reference voltage first threshold value (e.g. 5V) at the resistor R4/R5 junction, via resistor R8, which creates a programmable hysteresis level. The hysteresis level permits selection of the desired second threshold value, which is the short-circuit condition for turn-OFF (e.g. cut-out) of the MOSFETs. The zero-crossing detection circuit 18 therefore incorporates comparator reference threshold hysteresis so that when the MOSFETs ON-state voltage rises to a magnitude exceeding the original turn-ON threshold, a short-circuit condition is detected and the zero-crossing detection circuit 18 initiates turn-OFF of the MOSFETs Q16 and Q16. Thus, for example, the first and second threshold values 5V and 10V of rectified dimmer voltage (shown as reference voltage (V+) in the Figures) are derived from the zero-crossing detection circuit 18 comparator hysteresis reference voltages of 0.5V and 1.0V. That is, the rectified dimmer voltage (V+) is greater than the MOSFET ON-state voltage by an amount equal to the forward-bias voltage of the rectifier diode (in this example –0.5V). The selected first and second threshold values are thus sufficiently larger than the rectifier diode forward voltage drop such that the latter can be neglected in the calculations.

Figure 3A:
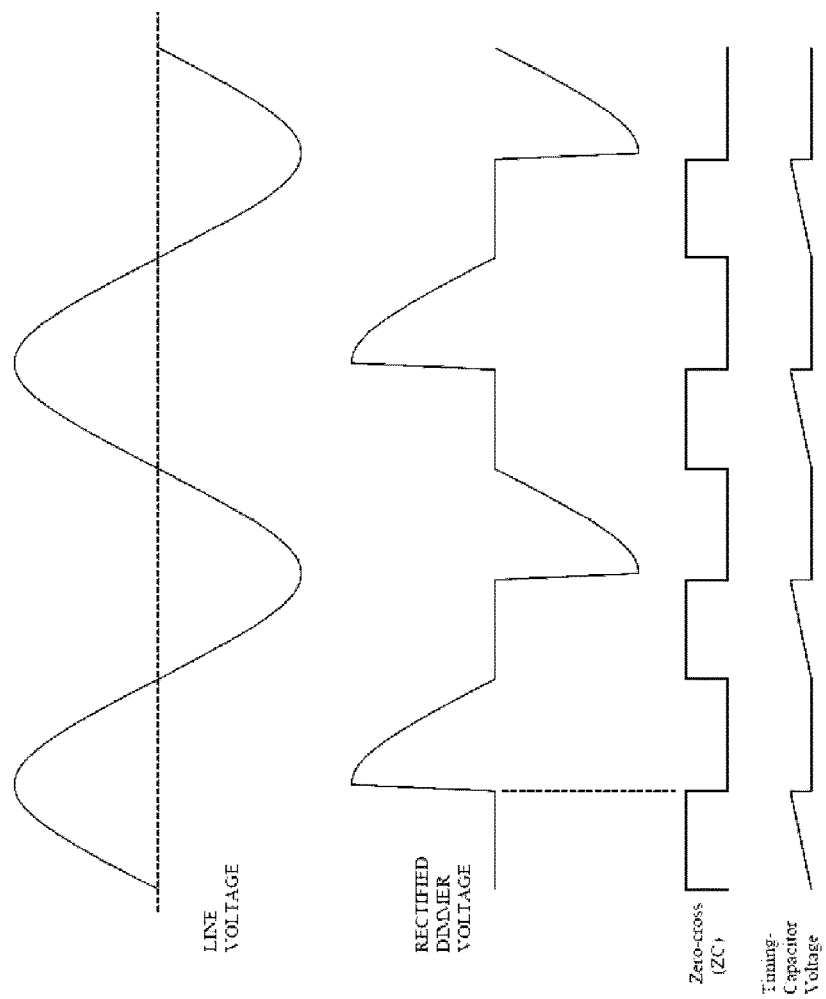
FIG. 3A shows waveforms of operation during normal operating conditions of a trailing edge phase control dimmer circuit according to an embodiment of the present invention.

The detection of a short-circuit condition by the zero-crossing detection circuit 18 initiates a fast-OFF output to the conduction period timing circuit 20, which activates the MOSFETs gate drive and begins conduction period timing whilst enabling the fast-OFF turn-off circuit 24. If, during half-cycle conduction period, the rectified dimmer voltage rises above the higher threshold value of the zero-cross detector—as result of a short-circuit condition—then the MOSFETs Q15 Q16 are rapidly turned OFF to protect the circuit 10 from the high energy condition. In normal half-cycle operation, as a consequence of conduction period timer expiry, the slower turn-OFF transition occurs via the gate drive circuit 26. Specifically, at the crossing of the first threshold value, diode D1 of the conduction period timing circuit 18 becomes reverse-biased to enable conduction period timing capacitor C1 to commence charging. Transistor Q6, with reference voltage based on the Zener diode ZD1, is used as a constant current source for timing capacitor C1. For example, the timing capacitor is a 10 nF capacitor. The timing capacitor voltage, zero-crossing at the first threshold value of 5V, rectified dimmer voltage and AC line voltage waveforms are shown in FIG. 3A.

Figure 3B:
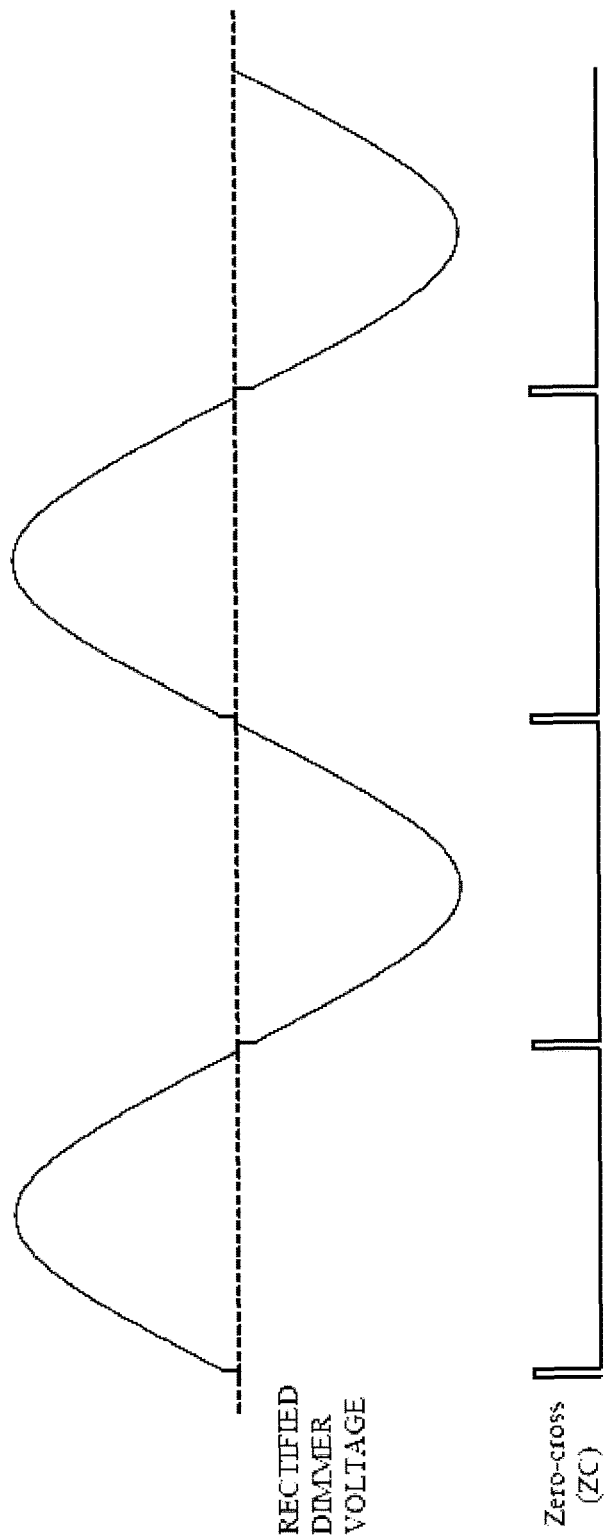
FIG. 3B shows waveforms of operation during short-circuit operating conditions of a trailing edge phase control dimmer circuit according to an embodiment of the present invention.

During the half-cycle conduction period, timer output transistors Q7 & Q8 are not in conduction, hence the self-biased transistor Q9 supplies base drive to the fast-turn-OFF gating transistor Q14 as described above. In half-cycle operation, when faced with driving a short-circuit load, the rising voltage across the MOSFET Q15 and Q16 will be detected by the zero-crossing detection circuit 18 as crossing the second threshold value (e.g. high zero-cross threshold (V+10V)) to cause the zero-crossing detection circuit 18 output to pull low. This provides based drive, via resistor R17, to transistor Q13, and hence achieves a faster turn-OFF due to relatively low value of associated gate discharge resistor R20. The rectified dimmer voltage during a short-circuit load and the zero-crossing waveforms are shown in FIG. 3B. At short-circuit load half-cycle operation, the rectified dimmer voltage rapidly rises (e.g. in less than 0.1 ms) above the zero-crossing second threshold value of 10V, which results in the premature termination of the conduction period. In normal half-cycle operation without short-circuit load, the conduction period timer output transistor Q8 collector pulls low, which has the dual effect of disabling fast turn-OFF circuit 24 via transistors Q9 & Q14 and the activation of normal slow turn-OFF via transistor Q12.

That is, following detection of a short-circuit condition by the zero-crossing detection circuit 18, during a prevailing conduction period, the state of the conduction period timing circuit 20 is such as to enable the fast-OFF circuit 24. The fast-OFF circuit 24 is normally enabled during the conduction periods, but is disabled at end of the half-cycle conduction periods to permit slow turn-OFF transition for EMI limiting purposes.

It will be understood that there may be other variations and modifications to the configurations describe here that are also within the scope of the present invention.

The invention claimed is:

1. A trailing edge phase control dimmer circuit for controlling alternating current (AC) power to a load with short-circuit protection, the circuit including:
   a switching circuit for controlling delivery of AC power to the load by conducting power to the load in an ON state and not conducting power to the load in an OFF state, wherein the ON state is a conduction period and the OFF state is a non-conduction period;
   a switching control circuit for controlling turn-OFF and turn-ON of the switching circuit at each cycle of the AC to control switching of the ON and OFF states of the switching circuit; and
   a rectifier for rectifying the AC power in the non-conduction period to generate rectified dimmer voltage to be provided to the dimmer circuit,
   wherein the switching control circuit includes a zero-crossing detection circuit configured to detect zero crossings of the AC and to detect crossings of a first threshold value and a second threshold value of the rectified dimmer voltage,
   wherein the zero-crossing detection circuit includes comparator functions of determining whether the rectified dimmer voltage crosses below the first threshold value and above the second threshold value,
   wherein the zero-crossing detection circuit outputs determinations of the comparator functions to a conduction period timing circuit of the switching control circuit, configured to determine the conduction periods, and wherein the conduction period timing circuit is configured to alter the conduction periods based on the outputs of the zero-crossing detection circuit, and wherein the conduction period timing circuit further includes timer output transistors, which are not in conduction during the conduction periods, to enable a self-biased transistor of the conduction period timing circuit to supply base drive current to a gating transistor of a fast-OFF circuit, and
   wherein the zero-crossing detection circuit is further configured to initiate the switching circuit to commence one of the conduction periods when the rectified dimmer voltage crosses below the first threshold value and to initiate the switching circuit to prematurely terminate one of the conduction periods when the rectified dimmer voltage crosses above the second threshold value to provide short-circuit protection for the trailing edge phase control dimmer circuit.

2. A trailing edge dimmer circuit as claimed in claim 1, wherein the switching circuit includes two MOSFETs to control turn-OFF and turn-ON at each half cycle of the AC respectively to the OFF and ON states.

3. A trailing edge dimmer circuit as claimed in claim 2, wherein the MOSFETs have gate driven latches which latch the MOSFETs to the ON state at each half cycle of the AC upon the zero-crossing detection circuit detecting the rectified dimmer voltage crossing below the first threshold value.

4. A trailing edge dimmer circuit as claimed in claim 3, wherein the MOSFETs gate driven latches unlatch the MOSFETs to the OFF state at each half cycle of the AC at an end of the conduction period, and the MOSFETs gate driven latches unlatch the MOSFETs to the OFF state upon the zero-crossing detection circuit detecting the rectified dimmer voltage crossing above the second threshold value.

5. A trailing edge dimmer circuit as claimed in claim 4, wherein the switching control circuit further includes the fast-OFF circuit for controlling a short-circuit turn-OFF transition of the MOSFETs unlatching to the OFF state extending for a selected short-circuit turn-OFF transition time upon the zero-crossing detection circuit detecting the rectified dimmer voltage crossing above the second threshold value.

6. A trailing edge dimmer circuit as claimed in claim 5, wherein the short-circuit turn-OFF transition time is proportional to a discharge time of MOSFETs gate capacitance of the MOSFETs.

7. A trailing edge dimmer circuit as claimed in claim 6, wherein the fast-OFF circuit for controlling the short-circuit turn-OFF transition includes a thirteenth transistor configured to be pulled low to cause discharge of the MOSFETs gate capacitance via a twentieth resistor with a selected resistance to select the discharge time of the MOSFETs gate capacitance.

8. A trailing edge dimmer circuit as claimed in claim 7, wherein the twentieth resistor is a 1KΩ resistor.

9. A trailing edge dimmer circuit as claimed in claim 1, wherein the zero-crossing detection circuit includes a differential first and second transistor to implement comparator functions of determining whether the rectified dimmer voltage crosses below the first threshold value and above the second threshold value.

10. A trailing edge phase control dimmer circuit for controlling alternating current (AC) power to a load with short-circuit protection, the circuit including:
   a switching circuit for controlling delivery of AC power to the load by conducting power to the load in an ON state and not conducting power to the load in an OFF state, wherein the ON state is a conduction period and the OFF state is a non-conduction period;
   a switching control circuit for controlling turn-OFF and turn-ON of the switching circuit at each cycle of the AC to control switching of the ON and OFF states of the switching circuit; and a rectifier for rectifying the AC power in the non-conduction period to generate rectified dimmer voltage to be provided to the dimmer circuit, wherein the switching control circuit includes a zero-crossing detection circuit configured to detect zero crossings of the AC and to detect crossings of a first threshold value and a second threshold value of the rectified dimmer voltage, wherein the zero-crossing detection circuit is further configured to initiate the switching circuit to commence one of the conduction periods when the rectified dimmer voltage crosses below the first threshold value and to initiate the switching circuit to prematurely terminate one of the conduction periods when the rectified dimmer voltage crosses above the second threshold value to provide short-circuit protection for the trailing edge phase control dimmer circuit, wherein the switching circuit includes two MOSFETs to control turn-OFF and turn-ON at each half cycle of the AC respectively to the OFF and ON states, wherein the MOSFETs have gate driven latches which latch the MOSFETs to the ON state at each half cycle of the AC upon the zero-crossing detection circuit detecting the rectified dimmer voltage crossing below the first threshold value, wherein the MOSFETs gate driven latches unlatch the MOSFETs to the OFF state at each half cycle of the AC at an end of the conduction period, and the MOSFETs gate driven latches unlatch the MOSFETs to the OFF state upon the zero-crossing detection circuit detecting the rectified dimmer voltage crossing above the second threshold value, wherein the switching control circuit further includes the fast-OFF circuit for controlling a short-circuit turn-OFF transition of the MOSFETs unlatching to the OFF state extending for a selected short-circuit turn-OFF transition time upon the zero-crossing detection circuit detecting the rectified dimmer voltage crossing above the second threshold value, wherein the short-circuit turn-OFF transition time is proportional to a discharge time of MOSFETs gate capacitance of the MOSFETs, wherein the fast-OFF circuit for controlling the short-circuit turn-OFF transition includes a thirteenth transistor Q13 configured to be pulled low to cause discharge of the MOSFETs gate capacitance via a twentieth resistor R20 with a selected resistance to select the discharge time of the MOSFETs gate capacitance, and wherein the zero-crossing detection circuit outputs determinations of the comparator functions to a conduction period timing circuit of the switching control circuit, configured to determine the conduction periods, and wherein the conduction period timing circuit is configured to alter the conduction periods based on the outputs, and wherein the conduction period timing circuit further includes timer output transistors Q7 & Q8, which are not in conduction during the conduction periods, to enable a self-biased transistor Q9 of the conduction period timing circuit to supply base drive current to a gating transistor Q14 of the fast-OFF circuit.

11. A trailing edge phase control dimmer circuit for controlling alternating current (AC) power to a load with short-circuit protection, the circuit including:

a switching circuit for controlling delivery of AC power to the load by conducting power to the load in an ON state and not conducting power to the load in an OFF state, wherein the ON state is a conduction period and the OFF state is a non-conduction period;

a switching control circuit for controlling turn-OFF and turn-ON of the switching circuit at each cycle of the AC to control switching of the ON and OFF states of the switching circuit; and a rectifier for rectifying the AC power in the non-conduction period to generate rectified dimmer voltage to be provided to the dimmer circuit, wherein the switching control circuit includes a zero-crossing detection circuit configured to detect zero crossings of the AC and to detect crossings of a first threshold value and a second threshold value of the rectified dimmer voltage, wherein the zero-crossing detection circuit includes comparator functions of determining whether the rectified dimmer voltage crosses below the first threshold value and above the second threshold value, and wherein the zero-crossing detection circuit is further configured to initiate the switching circuit to commence one of the conduction periods when the rectified dimmer voltage crosses below the first threshold value and to initiate the switching circuit to prematurely terminate one of the conduction periods when the rectified dimmer voltage crosses above the second threshold value to provide short-circuit protection for the trailing edge phase control dimmer circuit.

12. A trailing edge dimmer circuit as claimed in claim 11, wherein the switching circuit includes two MOSFETs to control turn-OFF and turn-ON at each half cycle of the AC respectively to the OFF and ON states.

13. A trailing edge dimmer circuit as claimed in claim 12, wherein the MOSFETs have gate driven latches which latch the MOSFETs to the ON state at each half cycle of the AC upon the zero-crossing detection circuit detecting the rectified dimmer voltage crossing below the first threshold value.

14. A trailing edge dimmer circuit as claimed in claim 13, wherein the MOSFETs gate driven latches unlatch the MOSFETs to the OFF state at each half cycle of the AC at an end of the conduction period, and the MOSFETs gate driven latches unlatch the MOSFETs to the OFF state upon the zero-crossing detection circuit detecting the rectified dimmer voltage crossing above the second threshold value.

15. A trailing edge dimmer circuit as claimed in claim 14, wherein the switching control circuit further includes the fast-OFF circuit for controlling a short-circuit turn-OFF transition of the MOSFETs unlatching to the OFF state extending for a selected short-circuit turn-OFF transition time upon the zero-crossing detection circuit detecting the rectified dimmer voltage crossing above the second threshold value.

16. A trailing edge dimmer circuit as claimed in claim 15, wherein the short-circuit turn-OFF transition time is proportional to a discharge time of MOSFETs gate capacitance of the MOSFETs.

17. A trailing edge dimmer circuit as claimed in claim 16, wherein the fast-OFF circuit for controlling the short-circuit turn-OFF transition includes a thirteenth transistor configured to be pulled low to cause discharge of the MOSFETs gate capacitance via a twentieth resistor with a selected resistance to select the discharge time of the MOSFETs gate capacitance.

18. A trailing edge dimmer circuit as claimed in claim 17, wherein the twentieth resistor is a 1KΩ resistor.

19. A trailing edge dimmer circuit as claimed in claim 11, wherein the zero-crossing detection circuit includes a differential first and second transistor to implement comparator functions of determining whether the rectified dimmer voltage crosses below the first threshold value and above the second threshold value.

* * * * *

UNITED STATES PATENT AND TRADEMARK OFFICE
CERTIFICATE OF CORRECTION

PATENT NO.         : 10,021,749 B2
APPLICATION NO.    : 15/313073
DATED              : July 10, 2018
INVENTOR(S)        : James Vanderzon It is certified that error appears in the above-identified patent and that said Letters Patent is hereby corrected as shown below:

On the Title Page

Column 1, Line 1, (71) delete "GERARD LIGHTING HOLDINGS PTY LTD, South Australia (AU)" and insert -- Ozuno Holdings Limited, Tortola (VG) --

Signed and Sealed this
Ninth Day of April, 2019

Andrei Iancu
*Director of the United States Patent and Trademark Office*